Jan. 8, 1963  C. H. BARNARD  3,071,970
TELEMETERING CONTROL FOR ISOLATED PROCESS
Original Filed July 29, 1955  2 Sheets-Sheet 1

INVENTOR.
CLAYTON H. BARNARD
BY
Raymond D. Junkins
ATTORNEY

Jan. 8, 1963 C. H. BARNARD 3,071,970
TELEMETERING CONTROL FOR ISOLATED PROCESS
Original Filed July 29, 1955 2 Sheets-Sheet 2

INVENTOR.
CLAYTON H. BARNARD
BY
Raymond W. Junkins
ATTORNEY

United States Patent Office 3,071,970
Patented Jan. 8, 1963

3,071,970
TELEMETERING CONTROL FOR ISOLATED
PROCESS
Clayton H. Barnard, South Euclid, Ohio, assignor to
Bailey Meter Company, a corporation of Delaware
Continuation of abandoned application Ser. No. 525,185,
July 29, 1955. This application July 16, 1958, Ser. No.
748,846
10 Claims. (Cl. 73—432)

The present invention relates to the problem of telemetering fluid pressures. More specifically, the present invention relates to the problem of transmitting the force of fluid pressures through the walls of sealed vessels.

One overall problem of utilizing fissionable materials is the isolation of these materials in vessels to avoid general contamination of their ambient locality. Consequently, different designs of containment vessels have been utilized to contain the structure necessary for the conversion of atomic power into the more conventional forms.

The safeguard structures utilized to prevent escape of radioactive material to the atmosphere, generally take many forms. These forms are dependent upon the characteristics of communications necessary between the inside and outside of the containment vessels. If electrical signals are to be transported into, or out of, the containment vessel, glass seals are a practical barrier to the contamination. If the force of fluid pressure signal is to be transmitted through the containment vessel wall, the structure necessary to telemeter the fluid pressure, while providing a contamination barrier, is less obvious.

It is the primary object of the present invention to provide the transmission of the force of fluid pressures through a wall, or barrier.

A further object of the invention is to provide a structure which will permit the transmission of fluid pressure force through multiple seals maintained in the wall between the interior and exterior of a vessel.

It is a further object of the invention to transmit a fluid pressure force through a wall, or barrier, while imparting thereto desired characteristics in addition to those generated by the source of the fluid pressure.

It is a further object of the invention to provide a relay structure extending through the wall of a sealed vessel which will respond to fluid pressures from one side of the wall in producing fluid pressures on the other side of the wall.

Figure 1:
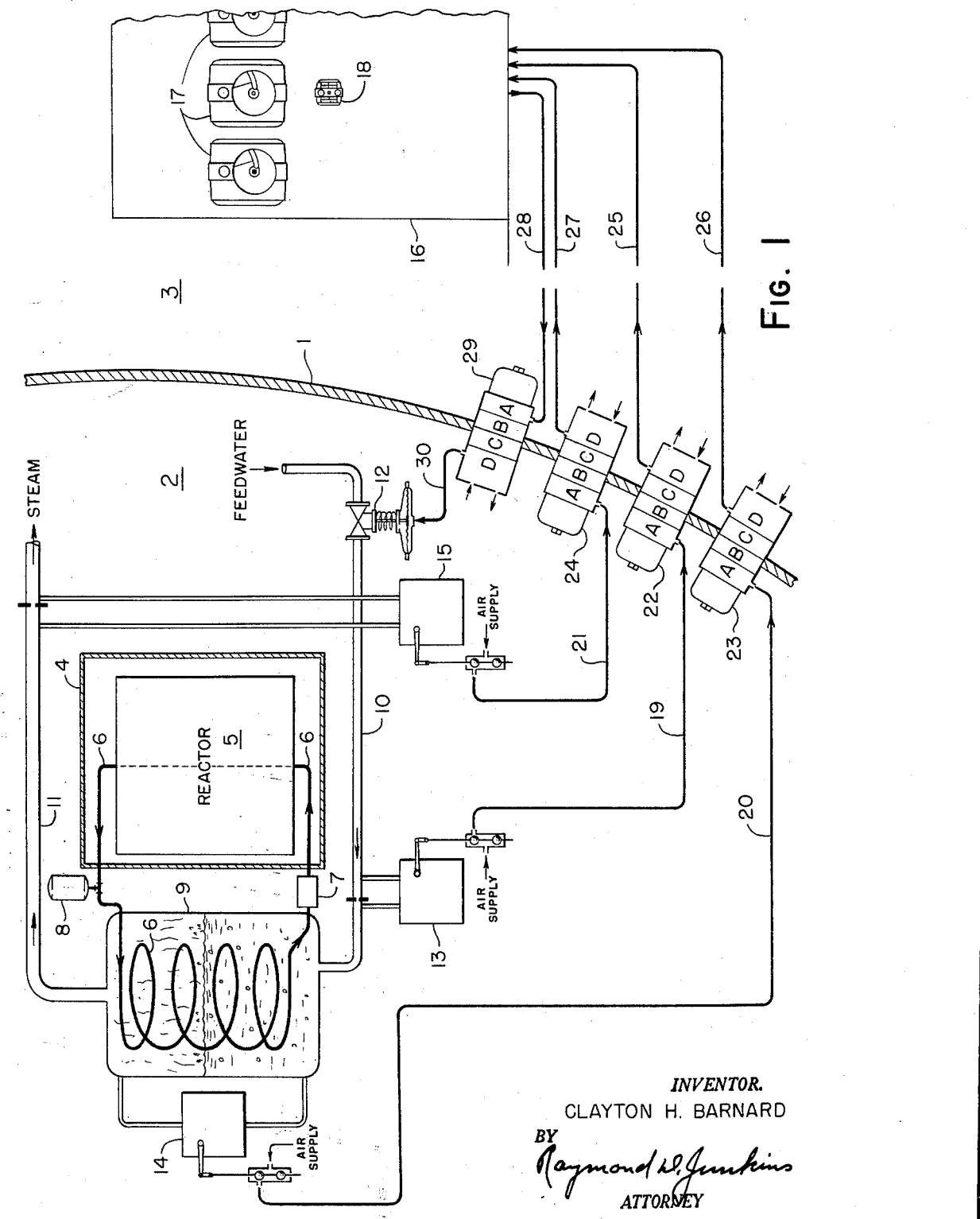
FIG. 1 is a diagrammatic representation of structure to produce power in a containment vessel and a control system utilizing the present invention.

Referring to FIG. 1, wall 1 represents the barrier offered by a vessel containing a nuclear reactor and associated structure for developing conventional steam power. Only a portion of sectioned wall 1 is visible in the drawing, the degree of arc to its curve implying that the size of the containment vessel isolates structure in addition to that depicted in this drawing. In general, the inside area 2 is presumed contaminated, or subject to be contaminated, to some degree, with the fissionable products of the reactor. The outside area 3 repersents the ambient locality protected from the contamination of area 2.

Within area 2, the drawing diagrammatically indicates a shield 4 for the nuclear reactor, as a source of heat. Reactor pile 5 is the specific source of heat within the shield and may take several forms. The specific form of reactor pile 5 is not pertinent to this disclosure. It is important that pile 5 produces heat under the direction of a control system not illustrated and transmits this heat to a closed circuit loop 6, containing a heat transfer medium which is circulated through the loop by pump 7. Volume chamber 8 represents structure necessary for expansion of the transfer medium and regulation of its pressure.

Under normal operation, shield 4 is the initial barrier against the escape of radiation and other materials dangerous to unprotected personnel in area 3. However, malfunction of shield and pile is always possible, and the preservation of the seal continuity of wall 1 is of paramount importance.

A portion of circuit 6 is arranged to come into intimate contact with water within boiler 9. Heat is transferred from circuit 6 to the water in the boiler to create steam. The feedwater converted to steam is transported into the boiler through conduit 10, and the steam generated in boiler 9 is transported therefrom through conduit 11.

A valve 12 is arranged in conduit 10 to offer resistance to flow of feedwater in regulating the amount of feedwater supplied boiler 9 from a source not shown. Apparatus ultimately utilizing the steam produced by the boiler 9 is also not shown. Both the source of supply for feedwater and the point of usage for the steam is presumed located somewhere in area 3. It is not a part of the present invention to contemplate the problems of transmitting feedwater and steam through wall 1 by means of structure including satisfactory safeguards.

The regulation of the feedwater in conduit 10 is important in illustrating the present invention. Valve 12 is brought under the control of indices derived from measuring the flow of water into boiler 9, the steam flow from boiler 9 and the level of water within boiler 9. To obtain these indices, meter 13 is arranged to respond to the differential pressures across a restriction in conduit 10, meter 14 responds to differentials across a vertical rise in boiler 9 spanning the range of water level and meter 15 is arranged to respond to the differentials across a restriction in conduit 11. These three meters are of conventional form, well known in the art, and produce mechanical motions in accordance with the differentials to which they are subjected. Linkage is illustrated for enabling the mechanical motions of the meters to position fluid pressure pilot valves which may take the form of structure disclosed in Johnson 2,054,464.

The present problem resolves around the transmission of the force of fluid pressures from the pilot valves of meters 13, 14 and 15 to a control panel 16 in area 3. On panel 16 are mounted recorders 17 which respond to fluid pressure outputs of the meters. Additionally, there is illustrated on panel 16, selector valve 18, representative of devices which offer the possibility of manually terminating the control fluid pressures developed from the output of the meters and substituting therefor manually determined fluid pressures. These selector valves may take the form of structure disclosed in an application, Dickey et al. S.N. 251,406, filed October 15, 1951, now Patent 2,729,222. The fluid pressure output forces of the meters may be utilized in a control system including relays similar to those disclosed in Gorrie S.N. 311,098, filed September 23, 1952, now Patent 2,776,669. Alternately, the system may be similar to that disclosed in Gorrie Re. 21,804. In either arrangement, the resultant control fluid pressure developed by the system is telemetered from panel 16, into area 2, for regulation of valve 12.

The foregoing orientation prepares for an understanding of the problem and its solution offered by the present invention. In a perspective review from meters 13, 14 and 15, it has already been appreciated that their fluid pressure outputs are established by their pilot valves and placed in pipes 19 and 20 and 21. The fluid pressure of these pipes are separately applied to relays 22, 23 and 24. The pressures in these pipes control these relays to produce outputs in pipes 25, 26 and 27 which are proportional to the pressures in pipes 19, 20 and 21.

In general, it can be appreciated that relays 22, 23 and 24 are mounted in wall 1. It can now be pointed out that relays 22, 23 and 24 are externally sealed to wall 1 so as to preserve the barrier-function of wall 1 while being controlled by the pressures in pipes 19, 20 and 21 to produce proportional pressures in pipes 25, 26 and 27.

The pressures in pipes 25, 26 and 27 are taken to panel 16 and caused to develop control pressures in pipe 28 which are imposed upon relay 29 to produce control pressures in pipe 30 which position valve 12 in feedwater conduit 10. The broad objects of the invention are thus achieved by the combination of structure including relays 22, 23, 24 and 29.

Figure 2:
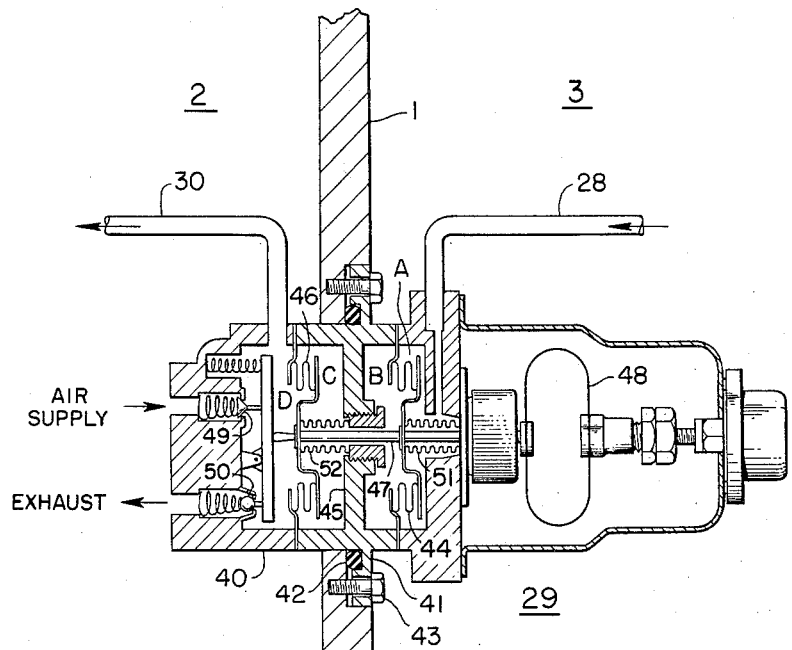
FIG. 2 is a sectional elevation of the relay included in the system of the invention.

Referring now to FIG. 2, there is shown, by a completely sectioned elevation, the internal details of a structure representative of relays 22, 23, 24 and 29, of FIG. 1. For specific reference, relay 29 has been taken as the representative relay enlarged in detail.

Pipe 28 is shown in FIG. 2, as well as wall 1 and pipe 30. Orientation is consummated by appreciating that pipe 28, in area 3, has a fluid pressure to be telemetered developed therein by the relay system of panel board 16, and relay 29 responds to the pressure to develop a proportional fluid pressure in pipe 30, in area 2. The fluid pressure in pipe 30 is then taken to valve 12 in order to regulate the feedwater in conduit 10.

Relay 29 is characterized by a main body casting 40 which is divided, internally, into compartments by fixed and movable walls. In these compartments, pressures are received and developed. The body itself extends through wall 1 so that access to certain compartments is made only from area 2 and access to other compartments is made only from area 3.

FIG. 2 also illustrates a suggested method of making a union between wall 1 and the external surface of body 40. Essentially this union structure comprises a circumferential flange 41 and an O-ring seal 42 between wall 1 and flange 41. Stud 43 represents the necessary number of similar structures needed to bring the flange, O-ring and wall into sealing cooperation against the escape of contaminating material from area 2 to area 3.

The compartments into which the interior of body 40 is divided have been designated, for convenience, A, B, C and D. Formed along the longitudinal axis of the generally cylindrical body 40, these compartments may be referred to as "stacked." So arranged, the compartments A and B are separated by flexible diaphragm 44 while compartments B and C are basically separated by rigid wall 45. Compartments C and D are separated by flexible diaphragm 46. A rigid rod 47 extends along the longitudinal axis of body 40, joining the flexible diaphragms and actuating supply and exhaust valves in compartment-chamber D.

The function of the structural components within body 40 now becomes more apparent. Spring 48 is caused to exert a predetermined constant force on rod 47 from one end and the forces developed in chambers A, B, C and D develop their own forces on rod 47 in actuating valves 49 and 50. Longitudinal actuation of rod 47 necessitates the use of sealing bellows 51 and 52 in order to maintain separation of chamber A from the atmosphere and chambers B and C from each other. Thus chambers B and C are separated by the combination of rigid wall 45 and bellows 52.

More specific analysis of the function of this structure can be derived from a number of patent disclosures, representatives of which is Dickey 2,098,913. For present purposes it is necessary only to appreciate that axial movement of rod 47 actuates valves 49 and 50 to develop fluid pressures in chamber D which are proportional to those conducted to chamber A by pipe 28. Further objects of the invention are achieved by the telemetered pressure in chamber A being reflected in the developed pressures in chamber D. It may now be declared that telemetered pressures are passed between area 3 and area 2, through wall 1, by a system including structures similar to relay 29.

While relay 29 becomes a conduit for telemetered pressures, through wall 1, it is desirable that it be appreciated how the "stacked" type of relay is peculiarly adapted to perform this function with inherent safeguards which meet requirements for structures associated with atomic powered apparatus. The serial arrangement of chambers A, B, C and D provide dual barriers to the transfer of contaminated material from area 2 to area 3. With area 2 contaminated, failure of flexible diaphragm 46, between chambers C and D, will leave sealing bellows 52 and flexible diaphragm 44 as dual barriers to the contamination reaching area 3. Should the wall of body 40 fracture, or fail, anywhere in area 3, the same degree of protection is afforded by at least diaphragm 46 and bellows 52.

In contemplation of a failure of sealing bellows 52, diaphragm 46 or the wall of 40 in area 2, a uniform degree of safeguard is provided. Thus, due to the inherent nature of the structural arrangement of relay 22, dual barriers are provided against fracture, or failure, of any single barrier component.

Figure 3:
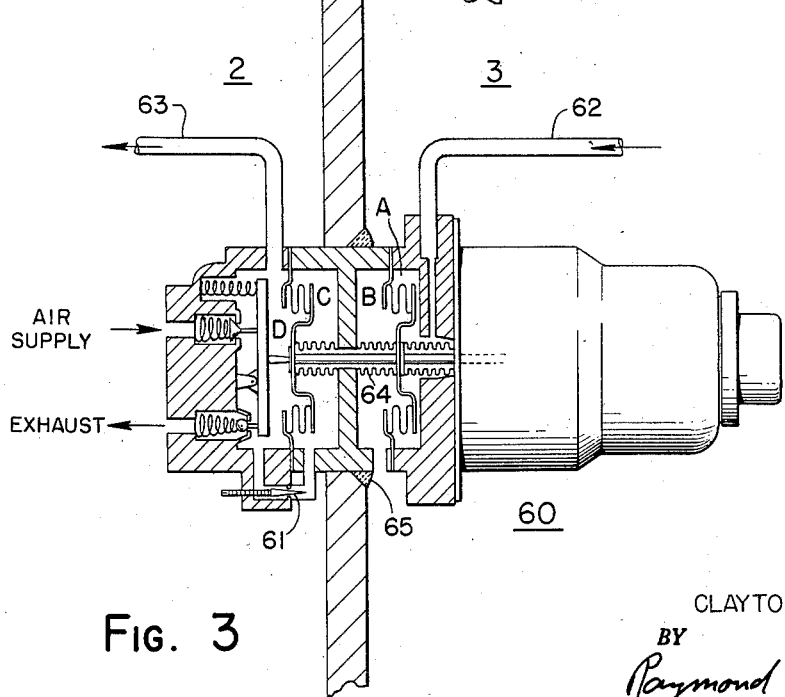
FIG. 3 is a partially sectioned elevation of a relay, of different form from that of FIG. 2, which may be incorporated in the invention.

Turning to FIG. 3, a "stacked" relay has been illustrated which functions in accordance with Gorrie Re. 21,804. This relay 60 has been included in the disclosure to give a more complete illustration of the function of relays of this type in the performance of the immediate objects of the invention. Relay 60 gives a standardizing function, as opposed to the proportional function of relay 29, necessitating the use of a bleed valve 61 between its chambers C and D. A loading pressure is imposed upon relay 60 by pipe 62 and the pressure developed in chamber D is placed in output pipe 63. Sealing bellows and flexible diaphragm are provided, parallel in character and functions with the bellows and diaphragms of relay 29. A specific problem arises, in attaining the objects of the invention, by the necessity of using bleed valve 61 and opening chamber B to atmosphere.

The inclusion of valve 61 in a relay structure similar to that of FIG. 2 and opening chamber B to atmosphere poses the possibility of exposing chamber B to contaminating materials of area 2. A failure of the rigid internal wall of the body, or its sealing bellows, would raise the possibility of cross-contamination between area 2 and area 3 through the bleed valve. Therefore, it is necessary that an additional sealing bellows be utilized in the form of the "stacked" relay disclosed in FIG. 3. Sealing bellows 64 is specifically provided to form this barrier function. With sealing bellows 64, the dual-barrier safeguards of the structure of FIG. 2 are preserved, and the complete objects of the invention may be realized.

Also it is pointed out that FIG. 3 illustrates another form of sealing between wall 1 and the relay body. Weld 65 may well be sufficient to seal the relay body and wall 1 together, alternate to the flange (O-ring) stud structure of FIG. 2.

Although it may be obvious, it is perhaps advisable to point out that regardless of the direction the relay extends through wall 1, it is feasible to provide a basic source of air supply for the valves of chamber D from either area 2 or area 3. A motor driven air compressor can be installed on either side of wall 1 and arranged to supply the valves of chamber D in order that the desired telemetered pressure be developed. Complete flexibility of the relay is thus provided, making it feasible to telemeter fluid pressures between areas 2 and 3 from either direction.

This application constitutes a continuation of my application S.N. 525,185 filed July 29, 1955, now abandoned.

What I claim as new and desire to secure by Letters Patent of the United States is:

1. A fluid pressure telemetering system for measuring and transmitting a signal representative of a process variable to a remote location through the wall of a sealed container enclosing the process, comprising a pneumatic transmitter positioned within the container and operative to develop a first fluid pressure signal representative of the magnitude of the process variable, a pneumatic relay extending through the wall of the container and comprising an elongated casing externally and circumferentially sealed to the container wall, said relay having a series of fluid chambers within said casing and arranged in series along the axis of said casing, the end chambers being positioned on opposite sides of the wall of the container and being physically and pneumatically isolated from each other, the first of said end chambers on the process side of the container wall having a movable wall movable in response to said first fluid pressure signal, means responsive to movement of said movable wall to establish a second fluid pressure signal in the second of said end chambers on the other side of the container wall, a conduit connecting said transmitter with said first end chamber for applying said first fluid pressure signal thereto, and a pneumatic receiver positioned externally of the container and responsive to said second fluid pressure signal to manifest the value of the variable.

2. The system of claim 1 in which said first end chamber movable wall is connected by a shaft to a valve means mounted in said second end chamber, said second chamber having a movable wall acting under the influence of said second fluid pressure on said shaft in opposition to the first said movable wall.

3. The system of claim 2 wherein said relay casing is provided with a partition aligned with the wall of the container and through which said shaft extends, and a bellows is provided for enclosing said shaft, said bellows having its opposite ends sealed to said first movable wall and said partition respectively.

4. A fluid pressure telemetering system for transmitting a pneumatic signal between a process within a sealed container and a remote location exteriorly of the container, comprising a transmitter positioned on one side of the wall of the container and cooperative with a first source of pneumatic pressure for establishing a first fluid pressure representative of the condition of the process, a receiver positioned on the other side of the wall, a pneumatic relay extending through the wall of the container and comprising an elongated casing externally and circumferentially sealed to the wall of the container to have the end portions thereof extending from opposite sides of the wall, said casing having a central transverse partition therein aligned with the wall of the container, a first pressure sensitive transverse movable wall positioned in one end portion of said casing defining a first pair of chambers on one side of said partition, a second pressure sensitive movable wall positioned in the other end portion of said casing and defining a second pair of chambers on the other side of said partition, means extending through said partition operatively connecting said movable walls, valve means cooperative with a second source of pneumatic pressure independent of said first source to establish a second fluid pressure in the end chamber on the receiver side of said partition under the control of said last named means, a conduit connecting said transmitter to the end chamber of said first pair of chambers to apply said first fluid pressure thereto, a conduit connecting the end chamber of said second pair to said receiver for transmitting said second fluid pressure to said receiver, and an opening from one of said chambers adjacent said partition to the atmosphere surrounding that end portion of said casing.

5. The system of claim 4 wherein said opening is in the chamber adjacent to the partition within the container.

6. A fluid pressure telemetering system for measuring and transmitting a signal representative of a process variable to a remote location through the wall of a sealed container enclosing the process, comprising a pneumatic transmitter positioned on one side of the wall for establishing a pneumatic pressure signal representative of the variable, a pneumatic receiver positioned on the other side of the wall, a pneumatic relay extending through the wall of the container and sealed thereto, said relay having an elongated body externally and circumferentially sealed to the wall and having a pair of fluid pressure chambers arranged in series along the axis of said body and disposed on opposite sides of the wall, a flexible wall associated with a first of said chambers on the transmitter side of the wall and movable in response to variations in pressure within said first chamber, valve means positioned in a second of said chambers on the receiver side of said wall, a mechanical connection between said movable wall and said valve means for actuating said valve means to establish a pneumatic pressure in said second chamber proportional to the fluid pressure in said first chamber, conduit means connecting said transmitter with said first chamber for applying said pneumatic pressure signal thereto, and conduit means connecting said receiver to said second chamber for applying said amplified fluid pressure to said receiver.

7. In a fluid pressure telemetering system for measuring and transmitting a signal representative of a process variable to a remote location through the wall of a sealed container, the combination comprising, a pneumatic relay extending through the wall of the container and comprising an elongated casing externally and circumferentially sealed to the wall, said relay having a pair of fluid pressure chambers within said casing pneumatically isolated on opposite sides of the wall, a movable wall associated with a first of said chambers and movable in response to variations in fluid pressure therein, valve means positioned in the second of said chambers for connecting a source of fluid pressure to said second chamber, a mechanical connection between said movable wall and said valve means for actuating said valve means to produce a proportional fluid pressure in said second chamber in response to a variation in pressure in said first chamber, a pneumatic transmitter positioned on the first chamber side of the wall and cooperative with a separate source of pneumatic pressure for establishing a pressure signal in said first chamber representative of the magnitude of the process variable, and a pneumatic receiver positioned on the second chamber side of the wall responsive to the fluid pressure in said second chamber for indicating and/or controlling the process variable, said transmitter and associated source, and said first chamber defining a pneumatic system pneumatically isolated from the pneumatic system defined by said receiver, said valve means and associated source, and said second chamber.

8. A telemetering system as claimed in claim 7 wherein said casing is provided with a transverse partition through which said mechanical connection extends said partition being aligned with the wall of the container for shielding said chambers from each other.

9. A telemetering system as claimed in claim 8 wherein said mechanical connection comprises an elongated shaft extending through an opening in said transverse partition.

10. A fluid pressure telemetering system for transmitting a signal through the wall of a sealed container enclosing a contaminated process comprising, a fluid pressure transmitter positioned on one side of the container wall but remotely therefrom effective to establish a first fluid pressure signal, a pneumatic relay having a casing extending through the wall of the container and sealed thereto, an expansible chamber having a movable end wall positioned in one end of said casing on said one side of the container wall, a conduit for transmitting said first fluid pressure signal to said expansible chamber, a source of fluid pressure on the other side of the container wall, valve means positioned in the other end of said casing on said other side of the container wall and operatively connected to said movable chamber wall to be actuated thereby in response to a variation in said first fluid pressure signal, said valve means being cooperative with said fluid pressure source upon said actuation thereof to establish a second independent fluid pressure signal on the other side of the container wall, isolating means in said casing for isolating said fluid pressure chamber from said valve means and said second source to insure isolation of said first and second fluid pressure signals, and a fluid pressure receiver positioned on said other side of the container wall and responsive to said second fluid pressure signal.

References Cited in the file of this patent

UNITED STATES PATENTS

| | | |
|---|---|---|
| Re. 21,804 | Gorrie | May 20, 1941 |
| 1,916,920 | Diehl | July 4, 1933 |
| 1,924,125 | Linderman | Aug. 29, 1933 |
| 2,265,114 | Hartley | Dec. 2, 1941 |
| 2,311,853 | Moore | Feb. 23, 1943 |
| 2,509,078 | Stover | May 23, 1950 |
| 2,536,184 | Johnson | Jan. 2, 1951 |
| 2,628,086 | Cutler | Feb. 10, 1953 |
| 2,649,714 | Griffith | Aug. 25, 1953 |
| 2,718,232 | Cook et al. | Sept. 20, 1955 |
| 2,834,362 | Gorrie et al. | May 13, 1958 |